United States Patent [19]

France

[11] Patent Number: 5,472,231

[45] Date of Patent: Dec. 5, 1995

[54] RETROFIT AIRBAG SYSTEM FOR VEHICLES

[76] Inventor: John J. France, 30600 Merry La., Lebanon, Oreg. 97355

[21] Appl. No.: 232,619

[22] Filed: Apr. 25, 1994

[51] Int. Cl.⁶ .................................................. B60R 21/18
[52] U.S. Cl. ............................................ 280/733; 280/734
[58] Field of Search .................................. 280/733, 734, 280/737

[56] References Cited

U.S. PATENT DOCUMENTS

| 5,062,662 | 11/1991 | Cameron | 280/733 |
| 5,098,122 | 3/1992 | Breed et al. | 280/735 |

OTHER PUBLICATIONS

Line Precision Co., Ltd., "AirBag Challa" five-page instruction manual, circa 1992.

*Primary Examiner*—Kenneth R. Rice
*Attorney, Agent, or Firm*—Klarquist Sparkman Campbell Leigh & Whinston

[57] ABSTRACT

A vehicle airbag system including a compressed gas source, an airbag, and a control member controlling gas flow to the airbag. A valve member slidably housed within the control member has an inactivated position wherein the canister is sealed. A pair of interlocked arms are operably connected to the valve member, and the arms unlock at a preselected vehicle deceleration to move the valve member to an activated position wherein the compressed canister gas is released to inflate the airbag. The airbag is preferably positioned on the safety belt of a vehicle seat to open forwardly from the shoulder belt.

20 Claims, 5 Drawing Sheets

RETROFIT AIRBAG SYSTEM FOR VEHICLES

TECHNICAL FIELD

The present invention is directed to an airbag system for motor vehicles.

BACKGROUND INFORMATION

Airbags have proved effective in protecting occupants of motor vehicles during accidents. New vehicles usually offer airbags for the driver's side, and sometimes passenger's side, of the vehicle front seat. Such airbags are installed within the vehicle steering wheel or dashboard. The airbag is usually activated by sensors positioned under the vehicle hood near the front of the vehicle. A predetermined impact activates the sensors, which communicate with a computer to direct the airbag inflation. Commonly, the ignition of a small amount of volatile chemical (such as sodium azide) produces gaseous nitrogen to inflate the airbag within about 0.05 seconds after an impact. Such airbags are typically made of opaque, carbon-reinforced plastic and deflate within a few hundredths of a second after inflation.

While such airbag systems usually provide excellent protection, disadvantages exist. The complicated electronics associated with airbags are vulnerable to malfunction, especially if exposed to heat, vibration, and corrosive elements under the hood of the vehicle. Moreover, airbags inflating from the steering wheel or dashboard are capable of injuring an occupant if the occupant is bent forward prior to airbag inflation. Such airbags may also project loose items at the occupant.

For cars not factory equipped with airbags, retrofit airbag systems have been developed. Such retrofit systems generally include airbags that inflate downward from the vehicle ceiling or upward from the occupant lap belt. A ceiling-based airbag may strike an occupant in the back of the head if the occupant is bent forward prior to the airbag inflation.

Moreover, such airbags are not entirely satisfactory in that they may rely on malfunction-prone electronic or magnetic systems for airbag inflation. Such retrofit inflation systems also tend to react relatively slowly, and inflate relatively small airbags that provide limited protection.

SUMMARY OF THE INVENTION

The present invention is directed to an airbag system and more particularly to one that is well-suited for retrofitting into a vehicle.

It is an object of the present invention to provide an improved airbag system with a reliable mechanical activation system.

Another object of the present invention is to provide an airbag system with an inexpensive compressed gas inflation source.

Yet another object of the present invention is to provide an airbag system with an airbag that focusses protection on the upper body and face of a vehicle occupant.

An additional object of the present invention is to provide an airbag system with an airbag that opens away from a vehicle occupant.

The airbag system comprises a gas source connected through a flow conduit to an airbag. A control member is mounted for shifting between a first position inhibiting gas flow to the airbag and a second position permitting such gas flow. An operating member is operably connected to the control member to be movable at a preselected vehicle deceleration between a first position holding said control member in its first position and a second position releasing said control member to shift to its second position to activate the control member to inflate the airbag.

The present system may also include a compressed gas canister connected to the control member as an inflating gas source. A slidable inertial weight may slide at the preselected deceleration to move the operating member between its first and second positions. The airbag may be positioned on a shoulder belt of a vehicle seat to open forwardly from the shoulder belt.

DESCRIPTION OF A PREFERRED EMBODIMENT

Figure 1A:
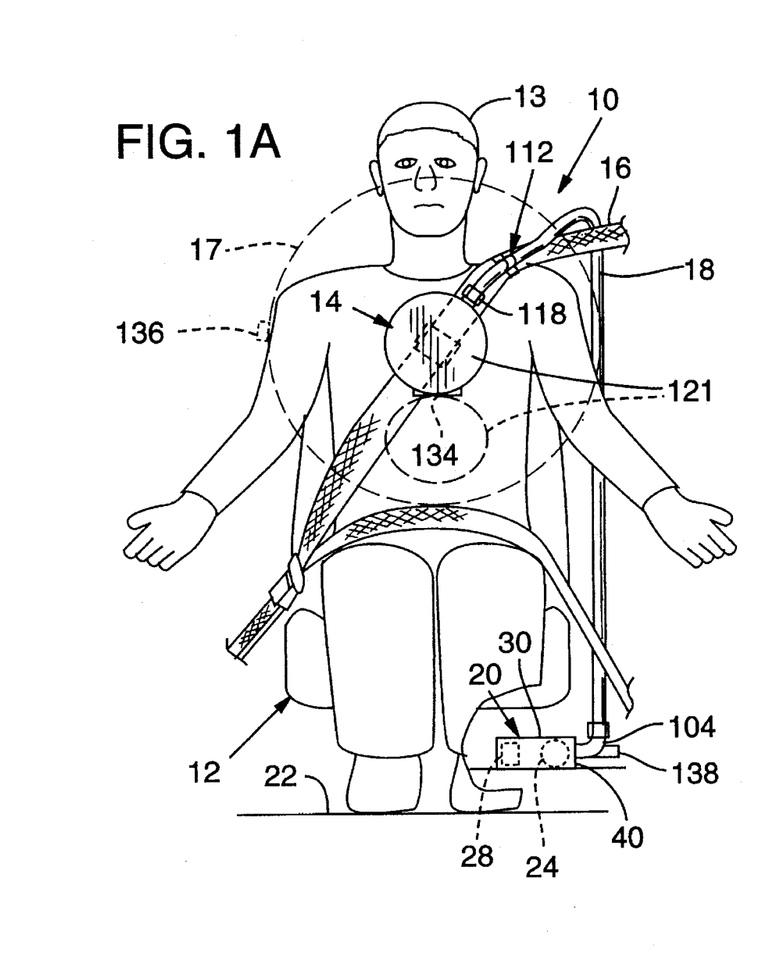
FIG. 1A is a front view of an airbag system in accordance with an embodiment of the invention, showing an airbag unit attached to an occupant's shoulder belt, with the inflated contour of the airbag shown with a dashed line, and the occupant being partially cut-away to show a control unit mounted beneath the occupant's seat.

A retrofit airbag system in accordance with a preferred embodiment of the present invention is designated in FIG. 1A with reference numeral 10. Although the present invention will be described in relation to a driver's seat 12, it is to be understood that the present invention may also be applied to all vehicle seats in all types of vehicles.

Figure 3:
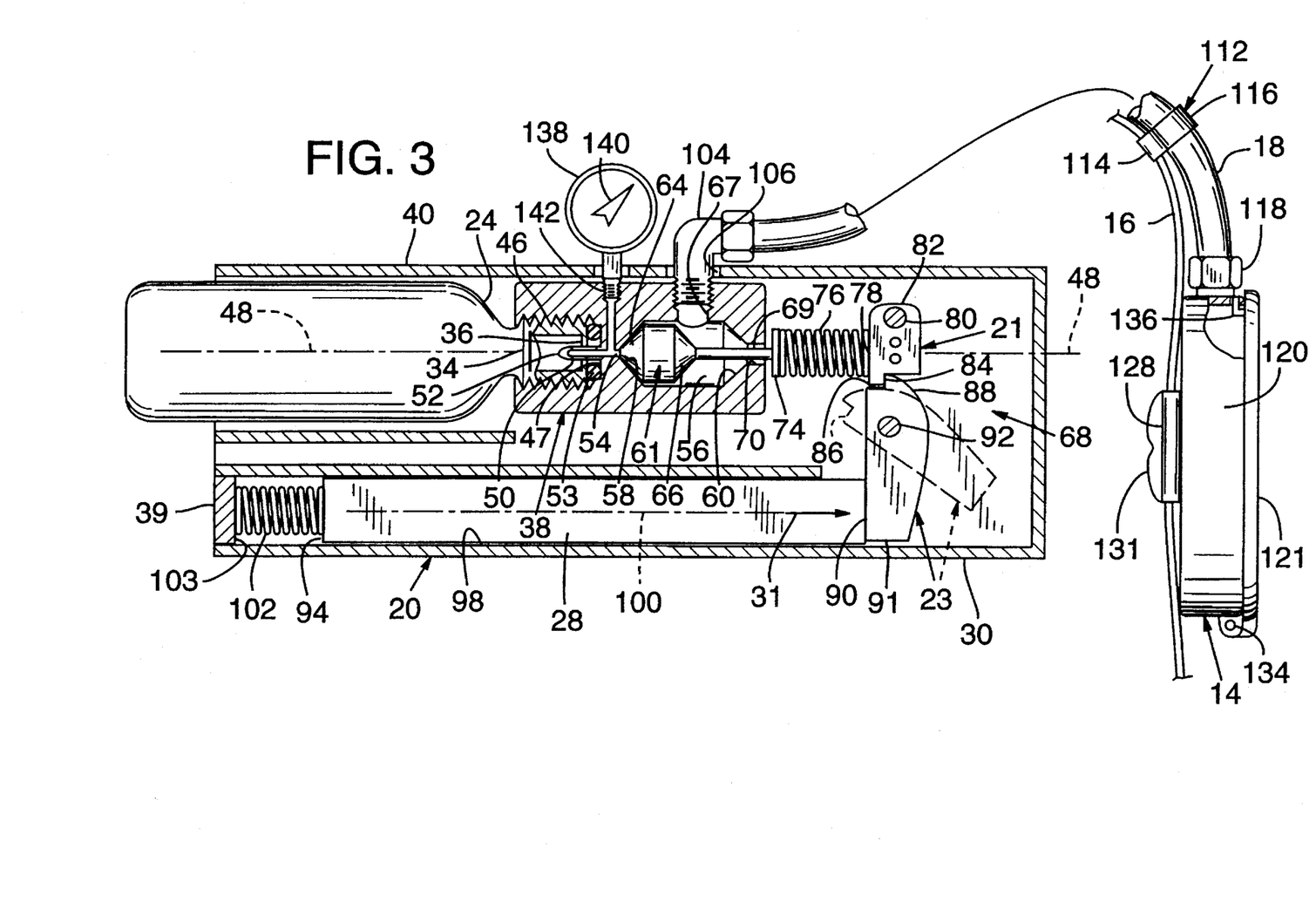
FIG. 3 is a cutaway view of the airbag system in accordance with an embodiment of the invention, showing a top plan view of the control unit in a closed (inactivated) condition.
Figure 4:
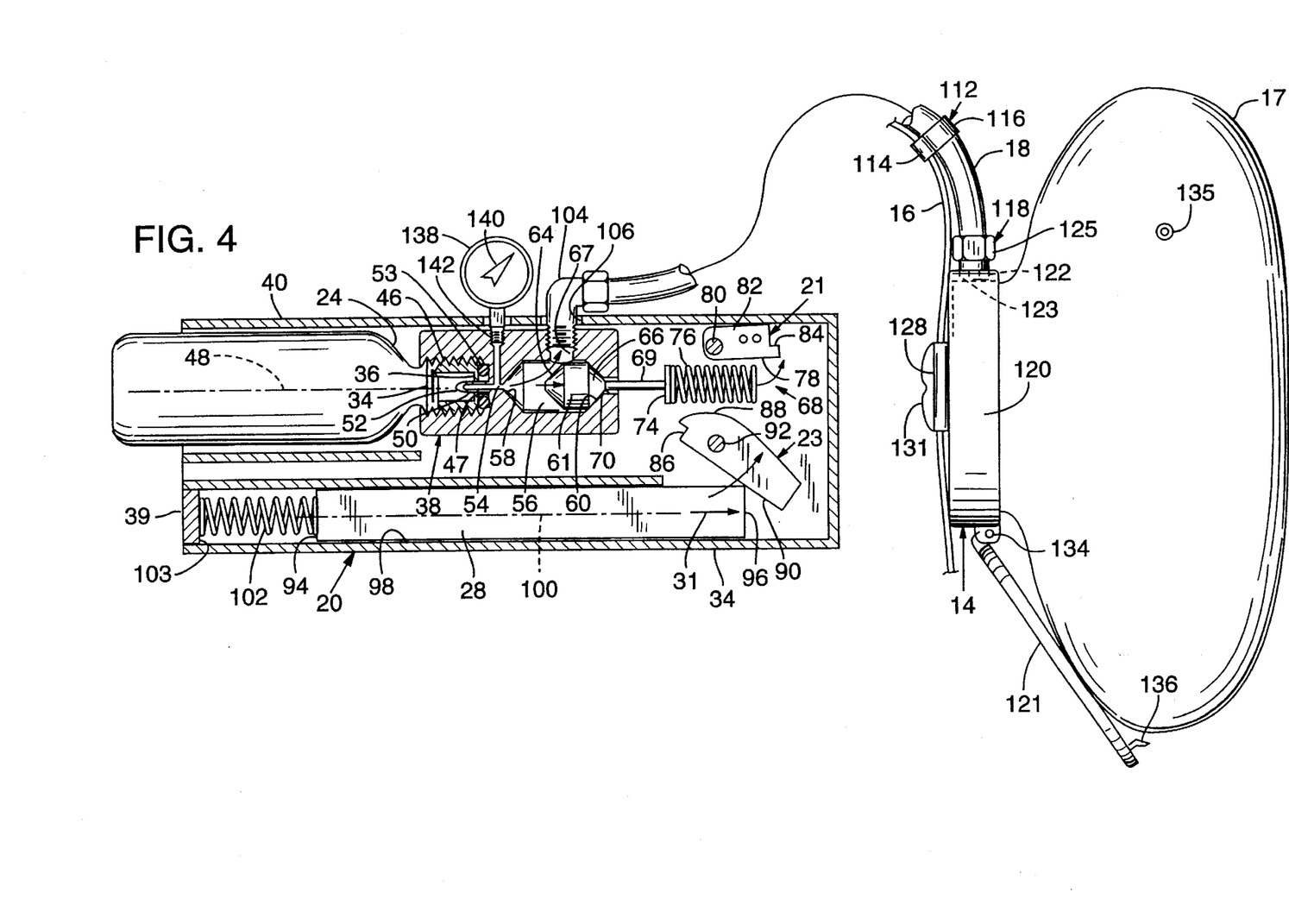
FIG. 4 is a view of the airbag system of FIG. 3, showing the control unit in an open (activated) condition, and the airbag inflated.

The airbag system has an airbag unit 14 attached to the driver's shoulder belt 16 that inflates away from the driver to focus protection over the upper body and head of the driver. A flexible hose 18 interconnects the airbag unit 14 and an activation control unit 20, which is mounted on the vehicle floor beneath the seat 12, or in various other selected locations within the vehicle. The control unit has a simple mechanical activation means in which a pair of interlocked operating members, such as arms 21, 23, are unlocked by movement of an inertial weight 28 at a preselected vehicle deceleration, as will be described in greater detail below (FIGS. 3 and 4). The unlocked arms permit discharge of a gas source, such as a compressed gas from a canister 24, to inflate the airbag 17 away from the occupant within about 0.05 seconds of an accident.

The detailed structure of the airbag system 10 will now be explained. As shown in FIG. 3, the control unit 20 has an elongate, box-like housing 30. The housing is preferably mounted beneath the seat 12 in alignment with the vehicle direction of movement (see directional arrow 31 in FIG. 1B). The housing 30 may be fastened to the vehicle floor 22 with sheet metal screws or other fasteners.

Figure 1B:
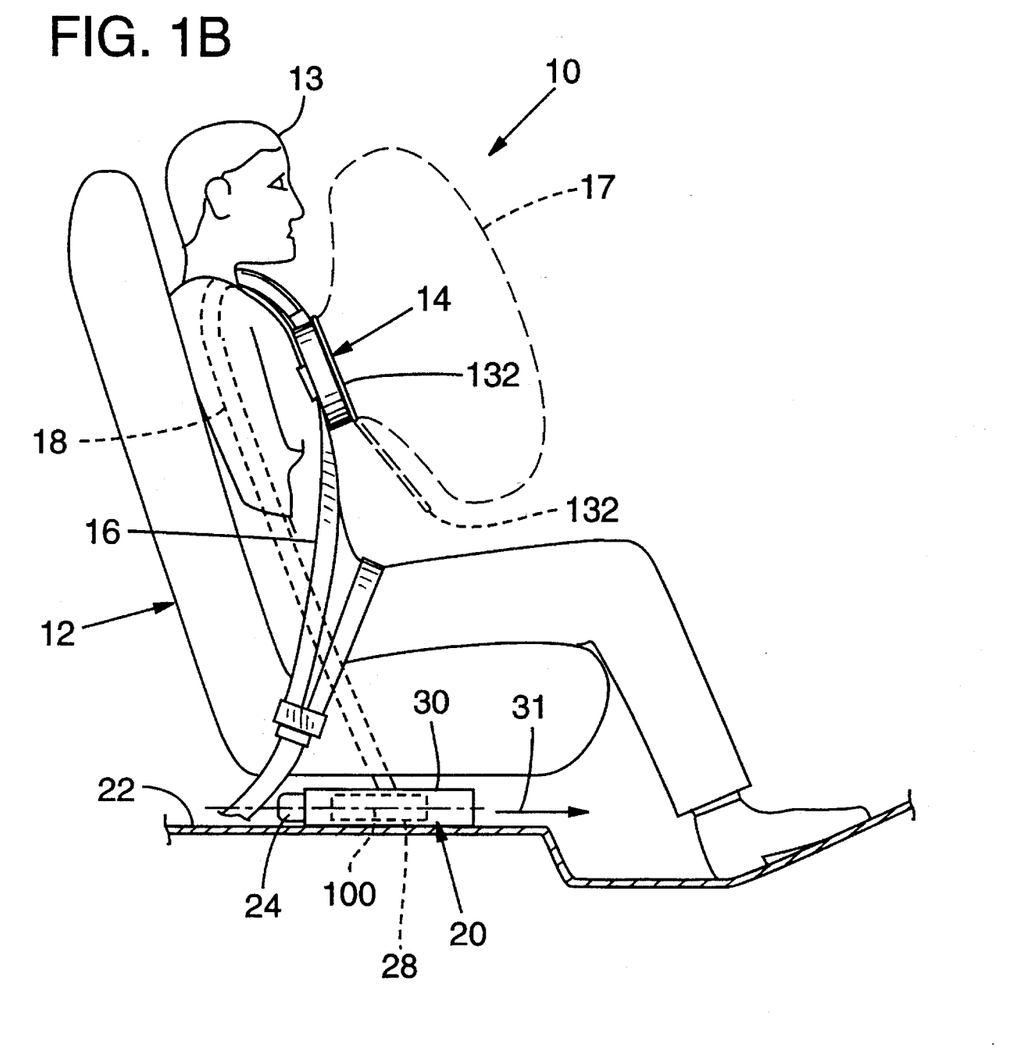
FIG. 1B is a side view of the retrofit airbag system of FIG. 1A.

In the embodiment shown in FIG. 3, the gas canister 24 is attached to a mounting member, such as mounting block 38 that is mounted within the housing at the outboard housing wall 40 (see FIGS. 1A and 1B). The canister 24 is bottle-shaped with a neck 34 having external threads and a pierceable seal 36. The canister neck 34 is threaded into a threaded aperture 46 within the mounting block 38. An end portion of the canister 24 extends from the rear side 39 of the housing for convenient manual canister installation and removal. It is also to be understood that alternative gas sources, such as ignitable volatile chemicals, may work as well with the present invention.

The threaded aperture 46 defines an axis 48 extending along the center of the canister 24 and through the mounting block 38. The threaded aperture 46 has a terminal wall 47 from which a hollow tubular puncturing member or tube 50 extends within the aperture along axis 48. The puncturing tube 50 has an inlet end 52 that is cut at a sharp angle relative to the axis 48 to puncture the canister seal 36 as the canister is threaded into the aperture 46. The canister neck interthreads snugly with the threaded aperture 46 to seal the canister. An 0-ring seal 53 compressed between the top of neck 34 and the aperture terminal wall provides an additional sealed barrier.

The opposite end of the puncturing tube 50 has an outlet at 54 into a valve cavity 56 defined within the mounting block 38. The valve cavity 56 is cylindrical and extends along the axis 48. The valve cavity 56 has first and second concave, conical end surfaces 58, 60, with the puncturing tube outlet 54 positioned at the center of the first conical end surface 58.

A control member, such as valve member 61 is positioned within the valve cavity 56 to normally seal the tube outlet 54. The valve member 61 is cylindrical with opposing first and second convex, conical end surfaces 64, 66, which are complementary to end surfaces 58, 60 of cavity 56. The valve member 61 has a first (inactivated) position wherein the first valve end surface 64 mates sealingly with the first cavity end surface 58 to seal the piercing tube outlet 54. The first valve end surface 64 may be made of nylon for a reliable seal. The valve member 26 is slidably shiftable along axis 48 to a second (activated) position wherein the first valve end surface 64 is spaced from the first cavity end surface 58 to unseal the tube outlet 54 (see FIG. 4).

As shown in FIG. 4, a gas outlet orifice 67 extends from the valve cavity 56 between the first cavity end surface 58 and the valve member first end surface 64 when the valve member is activated. The gas outlet 67 channels discharged canister gas from the mounting block 38 to the airbag when the system is activated.

As shown in FIGS. 3 and 4, the airbag system 10 is mechanically activated by simple mechanical activation means 68. A rod 69 extends forward from the tip of the valve second end surface 66 along axis 48. The rod 69 slidably protrudes through a rod aperture 70 in the mounting block 38. A disk 74 mounted on the distal end of the rod 69 provides an engagement surface for a compression spring 76.

As shown in FIG. 3, the compression spring 76 normally is compressed along axis 48 between the disk 74 and the first pivot arm 21. The first pivot arm 21 releasably interlocks with a second pivot arm 23 which is held in an inactivated position by the inertial weight 28.

The first pivot arm 21 is generally rectangular and oriented perpendicular across the axis 48 when in its locking, or inactivated, position shown in FIG. 3. The first arm 21 pivots about a pivot pin 80 adjacent end 82 of the first arm. The opposite end of the arm 21 has a shoulder 84 that interlocks with a notch 86 on the contiguous end of the second pivot arm 23. The actuator spring 76 engages the rear side 78 of the first arm 21 between the pivot pin 80 and the shoulder 84.

The second pivot arm 23 is longer than arm 21 and extends perpendicular to the axis 48 when in its locking, or inactivated, position as seen in FIG. 3. A curved cam surface 88 extends from the notch 86 along the forward longitudinal side of second arm 23. The inertial weight 28 engages the rear longitudinal side 90 of the second arm 23 adjacent the opposite end 91. The second arm 23 is pivotable about a second pivot pin 92 disposed about a third of the way between notch 86 and end 91.

The inertial weight 28 is an elongate member housed in a channel 98 along the inboard side of the housing 34. The weight is slidable along a weight axis 100 that generally extends in the vehicle movement direction 31. An inertial biasing spring 102 may be positioned between the channel rear wall 103 and the rear end 94 of the inertial weight to provide a selected forward bias to the inertial weight 28.

When inactivated, the pivot arms 21, 23, compression spring 76, and inertial weight 28 are in equilibrium. In general, the moment of the actuator spring 76 about the first pivot pin 80 equals the moment of the second arm notch 86 about the first pivot pin 80. The moment of the first arm shoulder 84 about the second pivot pin 92 equals the moment of the inertial weight 28 about the second pivot pin 92.

In the event of the preselected vehicle deceleration, the inertial weight 28 slides forward to unlock the arms 21, 23 to permit inflation of the airbag. Referring to FIGS. 3 and 4, the second arm 23 pivots counterclockwise to an unlock position wherein the second arm notch 86 slides off the first arm shoulder 84. Before the unlock position is reached, the counterclockwise movement of the second arm momentarily pivots the first arm 21 rearward, further compressing the compression spring 76. Once the first arm 21 is unlocked, the compression spring 76 deflects the first arm 21 forward over the second arm cam surface 88. The force of the compressed canister gas then rapidly activates the system by shifting the valve member 61 from its first position as shown in FIG. 3, inhibiting gas flow to its second position as shown in FIG. 4, permitting gas flow to inflate the airbag 17. When valve member 61 is shifted to the position illustrated in FIG. 4, surface 66 sealingly engages surface 60 to prevent escape of gas through aperture 70.

In the preferred embodiment, the inertial weight 28 activates the airbag system when the vehicle undergoes a deceleration corresponding to a front-end collision of about 22 mph. When vehicle decelerations of less than the preselected level occur, the components of the activation means 68 "flex" without unlocking. Weight 28 movement attending such minor decelerations causes the first and second arms to 21, 23 flex at the interlocked shoulder 84 and notch 86 without unlocking. The compression spring 76 absorbs the minor movement of the first pivot arm.

The activation means 68 exerts an axial preload force on the valve member 26 to seal the canister. One skilled in the art will understand that various permutations of compression and inertial bias spring rates, and first and second pivot arm lengths and pivot pin positions, will provide such axial preload on the valve member.

The preselected deceleration level may be varied. For instance, decreasing the rate of the compression spring 76, increasing the rate of the inertia spring 102, and increasing the mass of the inertial weight 28 each yields a more sensitive activation means 68. The lengths and pivot positions of the first and second pivot arms 21, 23 also affect the sensitivity of the activation means 68.

Figure 5:
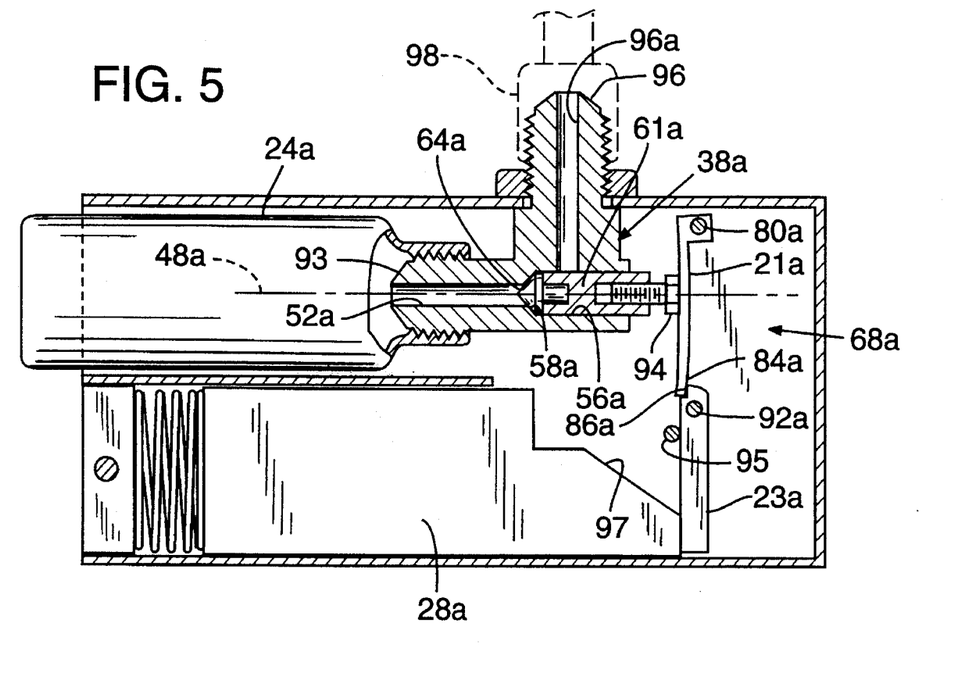
FIG. 5 is a cutaway view of the airbag system in accordance with another preferred embodiment of the invention, showing a top plan view of the control unit in a closed (inactivated) condition.
Figure 6:
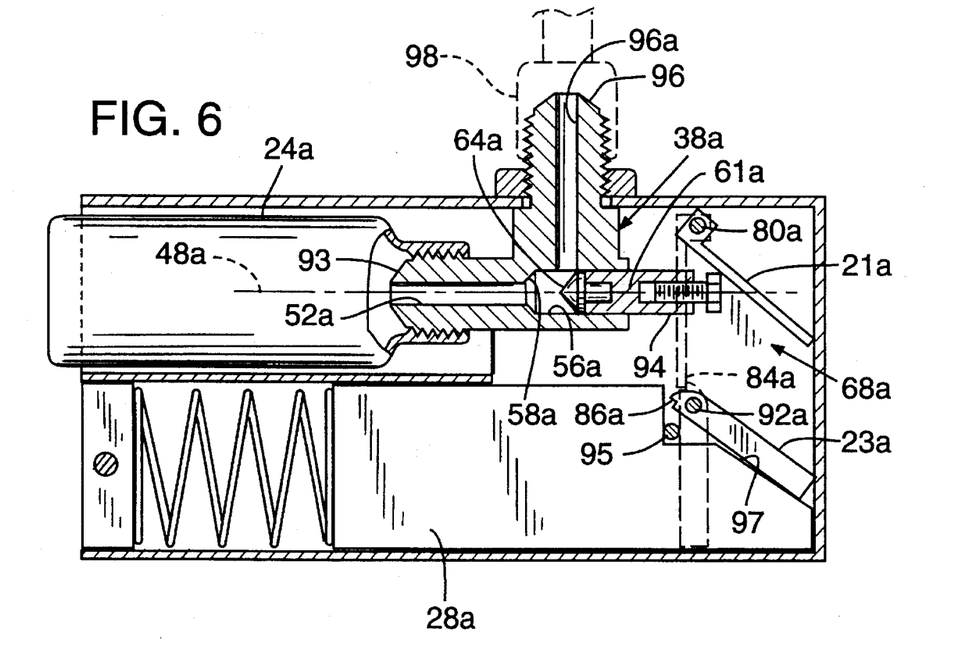
FIG. 6 is a view of the airbag system of FIG. 5, showing the control unit in an open (activated) condition.

FIGS. 5 and 6 show another preferred embodiment with a mounting member 38a, control member 61a, and activation means 68a. This embodiment shows a mounting member 38a with an externally-threaded canister fitment 93 for connection to a gas canister 24a with an internally-threaded neck. A cylindrical valve cavity 56a extends along axis 48a within mounting member 38a, and has a concave conical end surface 58a adjacent the fitment 93. An inlet orifice 52a extending from the tip of the conical end surface provides fluid communication between the canister and the valve cavity 56a.

The control member is a cylindrical valve assembly 61a that is slidably positioned within the cavity 56a. The valve assembly has a conical seal 64a at a first end. The seal is preferably made of nylon, and mates with the conical cavity end surface 58a to seal the fitment 93. The valve assembly 61a slides along the axis 48a to open the fitment inlet orifice 52a when the airbag system is activated. The mounting member 38a has an externally-threaded outlet fitment 96 with an aperture 96a to channel discharged canister gas out of the mounting member.

An adjustable screw member 94 is threaded into the opposite end of the valve assembly 61a. The screw 94 protrudes from the valve cavity 56a and engages an operating member shown as a pivotable resilient spring arm 21a. As will be discussed, the spring arm eliminates the need for a separate compression spring.

The spring arm 21a is a relatively flat member made of spring steel or other such resilient material, and has one end pivotally mounted on a first pivot pin 80a. As with the preceding embodiment, the opposite end of the spring arm is held by the notch 86a of a second pivot arm 23a. The valve assembly 61a centrally engages the spring arm, and the valve screw 94 is threadedly "backed-off" by a selected distance to deflect the spring arm in a shallow arch. The deflected spring arm acts like a leaf spring to axially load the valve assembly 61a to seal the inlet orifice 52a, and to hold the second arm 23a in the inactivated position. A stop pin 95 is positioned to set the second arm in an inactivated position perpendicular to the axis 48a.

Upon the preselected deceleration, the second arm is pivoted by the weight 28a to unlock the resilient spring arm. The pivoting of the second arm notch 86a rearwardly bends the spring arm end 84a until it slips forward over the notch at the unlock point (compare FIGS. 5 and 6). With the spring arm unlocked, the force of the compressed canister gas slides the valve assembly 61a into the open position. During minor weight movements due to minor decelerations, the spring arm 21a may flex without unlocking.

This alternative embodiment also shows an alternative design for inertial weight 28a. Weight 28a has a angled front surface 97 that focusses the force of the weight adjacent the extreme distal end 91a of the second arm 23a. The angle weight surface 97 thus maximizes the mechanical advantage of the second arm pivoting about the second pivot pin 92a.

Given a preferred valve member axial preload of about 450 pounds, the activation means 68a may be configured as follows. The spring arm 21a is configured to have spring rate of about 11.2 pounds per 1/1000-inch deflection at the leaf spring center. Thus, the valve screw is backed-off to deflect the spring arm about 40 thousandths of an inch to obtain the 450 pound preload.

Once activation means 68a is preloaded, the notch 86a needs to exert about an 800 pound force on the locked end 84a of the spring arm 21a to deflect the spring arm end about 1/16 of an inch to the unlock point. The second pivot pin 92a is positioned about one-eleventh of the way from the second arm notch 86a to the second arm distal end 91a, yielding about a 10 to 1 mechanical force advantage for the weight action. Accordingly, an 80 pound inertial weight force on the second arm distal end 91a moves the notch 86a with the required 800 pound unlock force.

Once the airbag system is activated, as shown in FIG. 4, the pressurized gas flows to the airbag 17 through the hose 18. In the embodiment if FIGS. 3 and 4, a tubular first hose fitment 104 connects the hose to the mounting member. The first fitment 104 has an externally-threaded end that protrudes through a fitment aperture 106 in the housing outboard wall 40 and is threaded into the gas outlet 67. The hose 18 is sealed to the opposite end of the fitment 104 by a compression nut 108. In the embodiment of FIGS. 5 and 6, the hose 18a has a internally-threaded fitment 98 for connection to the outlet fitment 96.

The hose 18 is preferably of a high-pressure-type for flexibility, toughness, and reliability. For added toughness, the hose may be sheathed in a steel braid. A longer hose tends to delay the airbag inflation. Thus, the activation means sensitivity may have to be increased, as described above, when a relatively long hose is used.

Figure 2:
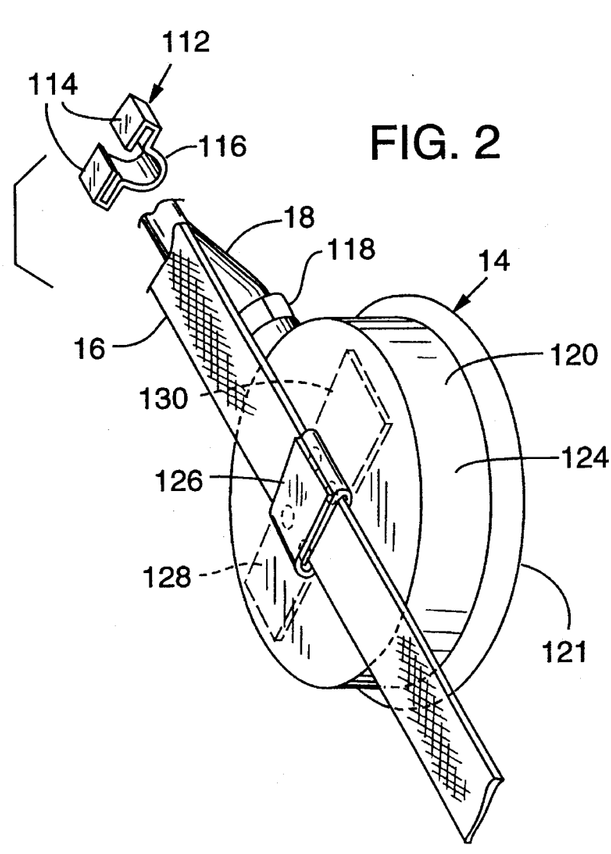
FIG. 2 is a perspective view of the airbag unit of the present invention showing the attachment of the airbag/unit to the shoulder belt.

As best seen in FIGS. 1A and 1B, the hose 18 extends upwardly from the control unit 20 to the airbag unit 14 mounted on the shoulder belt 16. The hose 18 is attached to the shoulder belt 16 at about shoulder level by a bracket 112. As shown in FIG. 2, the bracket 112 has a pair of narrow opposed U-shaped portions 114 that open inwardly to snugly receive opposing sides of the shoulder belt 16. An arcuate bracket portion 116 connects the opposing U-shaped portions 114, and receives the hose 18 against the shoulder belt 16. The bracket 112 snugly mounts upon the shoulder belt 16, but may be manually slid along the shoulder belt 16 if adjustment if desired.

As best shown in FIGS. 1A and 4, the airbag unit 14 has a disk-like shape with a peripheral side wall 120 and a hinged front panel 121. As shown in FIG. 4, a second fitment 118 attaches the hose 18 to the airbag unit 14. The second fitment 118 has a threaded end 122 that threads directly into an airbag aperture 123 in the side wall 120. A compression nut 125 seals the hose to the opposite end of the second fitment 118. The airbag 17 is sealed about the airbag aperture 123 to permit direct fluid communication between the hose 18 and the interior of the airbag 17.

The hose 18 may also be provided with an integral threaded end that threads directly into the airbag unit 14.

The airbag unit is attachable to the shoulder belt 16 by attachment means, such as attachment strap 126 (see FIG. 2). The attachment strap 126 is preferably made of leather or another flexible material for wrapping around the shoulder belt 16. The strap 126 has two opposing end portions 128, 130 that wrap over the back (driver's side) of the shoulder belt 16 and attach to each other by Velcro®, snaps, or other fasteners. The tight wrapping of the attachment strap 126 around the shoulder belt 16 provides secure mounting of the airbag unit 14, while allowing its slidable adjustment along the shoulder belt 16.

If desired, the airbag unit 14 may be fixed on the shoulder belt 16 by clips or other fasteners. For comfort, a thin pad 131 (FIGS. 3 and 4) may be attached to the strap end portion 128 that rests against the driver 13.

The airbag unit 14 is compact and holds the airbag 17 compactly folded therein. As shown in FIG. 4, the front panel 121 is hinged to a bottom edge of the side wall at hinge 134. The front panel 121 is normally held shut by snap means, such as a plastic shear pin 136. The shear pin 136 is held in an interior portion of side wall 120 when the front panel 121 is closed, and breaks as the front panel 175 opens. Thus, the shear pin 136 shown in FIG. 4 is broken. The breakage of the shear pin 136 is irreversible to render the airbag unit inoperable once the front panel is opened. Thus, the breakable shear pin 136 offers a safeguard against unauthorized repair or servicing of the airbag unit.

The airbag 17 is centrally positioned adjacent the center of the chest of the driver 13 to focus protection on the most vulnerable body portions—i.e., the head and upper body. The airbag unit 14 retains such position relative to the driver as the driver is thrown forward during an accident. The maintenance of the airbag position permits the preferred airbag to be relatively small (about 20 inches diameter by 10 inches thickness) and still offer excellent protection. The small volume of the present airbag 17 permits rapid inflation, and compact folding within the airbag unit 14. Thus, the airbag unit 14 may be compact and easily carried on the shoulder strap 16.

The airbag 17 generally inflates perpendicularly away from the upper body of the driver 13. The front panel 121 opens harmlessly downward and away from the upper body of the driver 13. Thus, the present airbag 17 will not "punch" a driver who is bent forward before the airbag is inflated, and is less capable of projecting loose items at the driver.

The airbag 17 may automatically deflate after an accident, or remain inflated to provide protection against secondary impacts, such as occur in "chain collision" accidents. A manual valve 135 may be conveniently provided on the airbag 17 to permit manual deflation by the driver. The airbag 17 may be made of transparent plastic material, such as mylar, that permits the driver to see through the inflated airbag.

In another aspect of the present invention, the mounting unit 20 is provided with a pressure sensing gauge 138, as shown in FIG. 3. The pressure gauge 138 is in continuous fluid communication with the compressed canister gas and continuously displays the gas pressure. The gauge is threaded into the mounting block 38 at a gauge aperture 142, which opens into the piercing tube 50.

As best shown in FIG. 1A, the gauge preferably extends from the outboard surface of the control unit 20 so that a gauge dial 140 is viewable beside the seat 12. Thus the canister 24 pressure may be conveniently monitored. The gauge face may be color-coded to clearly indicate safe canister pressures, and lower canister pressures where canister replacement is recommended.

The gas canister 24 of the present invention may be any of a variety of Department of Transportation (DOT) approved canisters. The gas canister volume and pressure will be generally dependent upon the size of the airbag 17, with a larger airbag requiring a larger canister and/or a higher canister pressure.

For added durability and corrosion resistance, components of the airbag system, such as the control housing 34, and arms 21, 23, may be made of stainless steel. The springs 76, 102 may also be stainless steel, or be gold plated. Other durable materials will work as well. To ensure the proper performance of the control unit 20, each control unit is preferably bench-tested at the factory. While the airbag 17 can withstand years of storage within the airbag unit 14 without deterioration, for added safety it is recommended that the airbag be replaced every four years.

While both preferred embodiments described above have pairs of arms 21, 23 and 21a, 23a, it is to be understood that a single arm may work as well. For instance, in FIG. 5, arm 23a could be replaced by a stationary notch member to hold the end of arm 21a in the inactivated position. The inertial weight 28a could be positioned to push arm 21a forward out of the notch at the preselected deceleration. Alternatively, the arm 21a could itself be weighted to slip out of the notch at the preselected deceleration.

Furthermore, while the described airbag systems activate upon a front-end collision, the inertial weight could be oriented in other directions to actuate in the cases of side or rear collisions.

The foregoing has been described in connection with a preferred embodiment. It will be appreciated by one of ordinary skill in the art, however, that various modifications and variations may be substituted for the mechanisms described herein while remaining defined by the appended claims and their equivalents.

I claim:

1. An airbag system for a vehicle, comprising:

an airbag;

a gas source connected through a flow conduit to said airbag, the gas source being a canister of compressed gas having a seal initially sealing the canister;

a control member mounted for shifting between a first position inhibiting gas flow to the airbag and an activated second position permitting such gas flow;

an operating member operably connected to the control member, the operating member having a first position holding said control member in its first position and being movable at a preselected vehicle deceleration to a second position releasing said control member to shift to its second position to inflate the airbag;

a mounting member whereon the canister is mounted, the mounting member having a tubular puncture member for puncturing the canister seal when the canister is mounted to the mounting member; and a valve cavity defined within the mounting member, the tubular puncture member having an outlet that opens into the valve cavity, and the valve cavity housing the control member, the valve cavity having a concave cavity surface with the puncture member outlet extending therethrough, and the control member having a convex surface complementary to said cavity surface which mates with the cavity surface to seal the puncture member outlet.

2. An airbag system according to claim 1, which includes an inertial weight movable generally in the direction of vehicle deceleration, the weight operably connected to move the operating member at the preselected deceleration to activate the control member.

3. An airbag system according to claim 1, further comprising a threaded aperture in the mounting member, and the canister having a threaded neck containing the seal that is threadedly mounted within the threaded aperture.

4. An airbag system according to claim 1, wherein the concave valve cavity surface and the convex control member surface are conical in shape.

5. An airbag system according to claim 1, wherein the airbag is stored within a storage unit that is attachable to a vehicle seat belt, the airbag being inflatable forwardly from the seat belt.

6. An airbag system according to claim 1, further comprising a pressure sensor attachable to the control member and communicating with the canister interior, the sensor operable to sense the pressure of the gas within the canister.

7. An activation system for inflating an airbag in a vehicle, comprising:

a gas source connected through a flow conduit to said airbag;

a control member shiftable between an inactivated position wherein the gas source is sealed and an activated position wherein gas is directed to flow to the airbag; and a resilient arm having an intermediate portion operably engageable with the control member and having first and second opposing ends that are held such that the resilient arm is resiliently held in a flexed configuration to hold the control member in the inactivated position, the first end of the resilient arm being releasable at a preselected vehicle deceleration to release the resilient arm from the flexed configuration to shift the control member to the activated position.

8. An activation system according to claim 7, wherein a first of the pair of arms is pivotable and interlocked with the second arm of the pair, the second arm being moved at the preselected deceleration to unlock the first arm to activate the control member.

9. An activation system according to claim 8, wherein the control member is held in an inactivated position by the first arm, and the control member is shiftable to an activated position to direct the flow of gas to the airbag when the first arm is unlocked.

10. An activation system according to claim 7, wherein the control member has a selectively extendable portion to vary the flexure of the resilient arm when the resilient arm is in the flexed configuration, thereby to selectively vary the sealing force of the resilient arm.

11. An activation system according to claim 7, wherein a mounting member defines a valve cavity in which the control member is slidably housed, the control member slidable between an inactivated position and an activated position for directing the flow of gas to the airbag, and the control member is held in the inactivated position by the pair of arms.

12. An activation system for inflating an airbag in a vehicle, comprising:

a gas source connected through a flow conduit to said airbag;

a control member shiftable between an inactivated position wherein the gas source is sealed and an activated position wherein gas is directed to flow to the airbag;

a pair of releasably interlocked arms operably connected to the control member, one of the pair of interlocked arms being movable at a preselected vehicle deceleration to unlock the arms, the unlocked arms permitting shifting of the control member to its activated position;

a first of the pair of arms being pivotable and interlocked with the second arm of the pair, the second arm being moved at the preselected deceleration to unlock the first arm to activate the control member, the control member being held in the inactivated position by the first arm, and the control member being shiftable to the activated position to direct the flow of gas to the airbag when the first arm is unlocked, and the first arm being an elongate resilient member that is centrally engaged by the control member in the inactivated position, the first arm being deflected by the control member to bias the control member into the inactivated position.

13. An activation system according to claim 12, wherein the control member has a protruding adjustment member that centrally engages the first arm, the protrusion of the adjustment member being adjustable to vary the deflection of the first arm.

14. An activation system according to claim 12, wherein an inertial weight is movable at the preselected deceleration to move the second arm.

15. An activation system for inflating an airbag in a vehicle, comprising:

a gas source connected through a flow conduit to said airbag;

a valve surface with a flow orifice defined therethrough positioned along said flow conduit; and a resilient arm having a first resiliently flexed configuration in which the resilient arm operably seals the flow orifice, the resilient arm responsive to a selected vehicle deceleration to move to a second released configuration in which the flow orifice is unsealed to permit gas to flow to the airbag.

16. An activation system according to claim 15, wherein a control member is disposed between the resilient arm and the valve surface to seal the flow orifice when the resilient arm is in the first configuration.

17. An activation system according to claim 16, wherein one of the valve surface and the control member has a concave surface and the other of the valve surface and the control member has a convex surface, the concave and convex surfaces snugly matable together when the resilient arm is in the first configuration.

18. An activation system according to claim 16, wherein the control member has a selectively extendable portion to vary the flexure of the resilient arm when the resilient arm is in the first configuration, thereby to selectively vary the sealing force of the resilient arm.

19. An airbag system for a vehicle, comprising:

an airbag;

a gas source connected through a flow conduit to said airbag, the flow conduit defining a gas flow direction;

a valve surface with a flow orifice defined therethrough positioned along said flow conduit; and a control member mounted for shifting between a first position wherein the control member is mated with the valve surface to inhibit gas flow through the flow orifice to the airbag and an activated second position wherein the control member is spaced in the flow direction from the valve surface to permit such gas flow.

20. An activation system according to claim 19, wherein one of the valve surface and the control member has a concave surface and the other of the valve surface and the control member has a convex surface, the concave and convex surfaces snugly matable together the control member matable with a valve surface.

* * * * *